UNITED STATES PATENT OFFICE.

ELWOOD F. McDOWELL, OF PHILADELPHIA, PENNSYLVANIA.

LINING BRICK OR BLOCK FOR METALLURGICAL FURNACES AND METHOD OF PREPARING SAME.

SPECIFICATION forming part of Letters Patent No. 662,288, dated November 20, 1900.

Application filed August 4, 1899. Serial No. 726,188. (Specimens.)

*To all whom it may concern:*

Be it known that I, ELWOOD F. MCDOWELL, a citizen of the United States, residing in Philadelphia, Pennsylvania, have invented certain Improvements in Lining Bricks or Blocks for Metallurgical Furnaces, &c., and in the Method of Preparing the Same, of which the following is a specification.

The object of my invention is to so prepare bricks for lining metallurgical furnaces and the like that the rapid destruction of the bricks by reason of the intense heat to which they are subjected will be prevented.

In lining and reparing linings of metallurgical furnaces much difficulty is experienced because of the tendency of the bricks employed to crack and fly apart when subjected to the intense heat usually maintained in such furnaces, this being true both of "acid" and "basic" bricks when prepared and burned in the usual way. Consequently in starting a furnace the same must be slowly and gradually heated, and in order to make repairs the furnace must be cooled down and slowly heated again. Attempts have been made to overcome this objection by combining tar or other carbonaceous material with the fire-clay or other acid material or the magnesite or other basic material used in the manufacture of the bricks, the tar being mixed with the material in the raw state and the blocks or bricks made from the compound being then burned in the kiln in the usual way. The objection to this plan is that the carbonaceous residue is more or less eliminated, especially upon the outer surface of the bricks where the oxidizing-gas of the heated kiln comes in contact with said bricks, and it has been found that bricks prepared in this way are but little, if any, better than those in which no carbonaceous material has been used. I find, however, that ordinary furnace-lining bricks or blocks, whether of acid or basic material, after having been fully burned in the kiln, even in the case of silicious bricks, to the point of vitrification may be caused to take up or absorb and retain sufficient carbonaceous matter to serve as a bond for the particles composing the brick, which bond will serve to prevent the fracture and flying apart of the brick when the same is suddenly subjected to high temperature, as when employed in lining a metallurgical furnace or repairing the lining of the same, and I find that when bricks prepared in accordance with my invention are used for either of these purposes much time is saved and loss of heat prevented both in starting the furnace and in repairing the lining or other parts of the same.

I effect the impregnation of the burned brick with carbonaceous material by boiling the brick in liquid hydrocarbon or soaking it in said liquid hydrocarbon while the latter is heated to a temperature of 100° Fahrenheit or more.

The hydrocarbon which I prefer to use is mineral-tar or, as it is commonly termed, "coal-tar" or "liquid hydrocarbons other than tar," such as the heavy oils, and I find it advisable to combine with the liquid hydrocarbon sufficient of a solid hydrocarbon—such, for instance, as resin—to insure the hardening of the compound contained in the brick when the latter is removed from the treating vessel and is permitted to cool. By this means the bricks are prevented from sticking together when piled, and they can be handled and transported more conveniently than if the tar or other hydrocarbon remained in a soft and sticky condition.

Without claiming broadly, therefore, impregnating a furnace-lining brick consisting of basic or acid material with one or more hydrocarbons, I claim and desire to secure by Letters Patent—

1. The mode herein described of preparing blocks or bricks for the linings of internal parts of metallurgical furnaces, said mode consisting in first burning the bricks and then impregnating the same with liquid hydrocarbon, substantially as specified.

2. The mode herein described of preparing bricks or blocks for the linings or internal parts of metallurgical furnaces, said mode consisting in first burning the bricks and then impregnating the same with a heated liquid hydrocarbon which is solid at ordinary atmospheric temperatures.

3. A burned brick for furnace-linings, &c., said brick being saturated or impregnated with unburned carbonaceous material, substantially as specified.

4. A burned brick for furnace-linings, said brick being saturated or impregnated with unburned carbonaceous material which is solid at ordinary atmospheric temperatures, substantially as specified.

In testimony whereof I have signed my name to this specification in the presence of two subscribing witnesses.

ELWOOD F. McDOWELL.

Witnesses:
WILL. A. BARR,
JOS. H. KLEIN.